US005311968A

United States Patent [19]
Pingel

[11] Patent Number: 5,311,968
[45] Date of Patent: May 17, 1994

[54] PROGRESSIVE DISTRIBUTOR FOR LUBRICANTS

[75] Inventor: Hans Pingel, Pegnitz, Fed. Rep. of Germany

[73] Assignee: Baier & Köppel GmbH & Co., Präzisionsapparate, Fed. Rep. of Germany

[21] Appl. No.: 951,007

[22] Filed: Sep. 25, 1992

[30] Foreign Application Priority Data

Sep. 26, 1991 [DE] Fed. Rep. of Germany ... 9112030[U]

[51] Int. Cl.⁵ ............................................. F01M 1/18
[52] U.S. Cl. .................................... 184/6.4; 184/7.4; 184/29; 184/108
[58] Field of Search .............. 184/6.4, 7.4, 8, 29, 184/108

[56] References Cited

U.S. PATENT DOCUMENTS

| | | | |
|---|---|---|---|
| 3,220,375 | 11/1965 | Gruber et al. | 184/7.4 |
| 3,438,468 | 4/1969 | Gruber | 184/7.4 |
| 3,653,466 | 4/1972 | Fujita et al. | 184/7.4 |
| 3,888,420 | 6/1975 | Boelkins | 184/7.4 |

FOREIGN PATENT DOCUMENTS

| | | |
|---|---|---|
| 1156482 | 10/1963 | Fed. Rep. of Germany . |
| 1902587 | 8/1969 | Fed. Rep. of Germany . |
| 6603392 | 9/1969 | Fed. Rep. of Germany . |
| 1475550 | 4/1972 | Fed. Rep. of Germany . |
| 3427660 | 2/1986 | Fed. Rep. of Germany . |
| 1105176 | 3/1968 | United Kingdom . |
| 1160336 | 8/1969 | United Kingdom . |
| 1265947 | 3/1972 | United Kingdom . |
| 2071227 | 9/1981 | United Kingdom ............... 184/7 D |

OTHER PUBLICATIONS

Brochure of the firm of Dropsa SpA, Milan, Italy, pp. A1–A5, entitled Modul-Progressivverter Der Zweiten Generation "SMO-SMX" (Second Generation Modular Progressive Distributor SMO-SMX).

Brochure #0094.07.85 of the firm of Woerner GmbH & Co., Wertheim, Germany, describing progressive distributor model Nos. VPA-B205.300, VPA-C.205.000, and VPA-D205.600.

Primary Examiner—Thomas E. Denion
Attorney, Agent, or Firm—Bacon & Thomas

[57] ABSTRACT

A progressive distributor for lubricants, and in particular for central lubricating equipment, includes a row of metering elements and a base plate made up of individual feed components or segments provided with apertures and conduits for lubricant supply to the metering elements. To meet, in practice, requirements for exchanging the metering elements at minimal equipment and assembly costs, an intermediate plate is provided between the metering elements and the base plate. The metering elements are detachably connected, preferably screwed, to the intermediate plate, and the intermediate plate is detachable connected, preferably screwed, to the base plate.

6 Claims, 4 Drawing Sheets

PROGRESSIVE DISTRIBUTOR FOR LUBRICANTS

BACKGROUND OF THE INVENTION

1. Field of the Invention

The invention concerns a progressive distributor for lubricants, in particular for use in central lubricating equipment, which includes a series of metering elements and a base plate made up of individual feed components or segments provided with apertures and conduits for lubricant supply to the metering elements.

2. Description of Related Art

In progressive distributors of the type used in central or one shot lubricating equipment, the lubricant which is to be moved to the particular lubrication point controls its discharge or conveyance by means of pistons present in the metering elements of the progressive distributor, the pistons being displaced by the lubricant.

One such progressive distributor is known from a brochure issued by DROPSA SPA, Milan entitled "2nd-generation modular progressive distributor SMO-SMX". A number of the metering elements (also called modules) are provided. Each metering element is detachably screwed on a so-called base plate which is constituted in turn by individual components of which the purpose is to guide the lubricant to the metering elements, i.e., the modules, and there to move returned or released lubricant to the particular discharges. While the metering elements may be detached per se from the base plate and be exchanged with corresponding new ones, and the associated conduits need not be detached in the process, it is nevertheless a drawback that in some cases of progressive-distributor malfunction it is a fairly complex matter to ascertain which of the detector elements is defective, and hence which one causes the particular malfunction or failure, and most of all, to do so on site. To find out, all metering elements must be unscrewed individually and be sent to the shop, and a corresponding number of new metering elements must be screwed onto the base plate at the site. This procedure is complex and requires considerably assembly work on site, and such work is known from experience to be time-consuming and hence correspondingly expensive. Such expenditures are avoided only when it is known on site which metering element must be exchanged, for instance for a controlled change in lubricant conveyance using another metering element, and only then is it possible to unscrew deliberately the particular metering element and replace it with the new one.

Another progressive distributor is known from the brochure ZENTRALSCHMIERANLAGEN #0094.07.85 from Eugen Woerner GmbH & Co, Wertheim, D-6980, wherein a distributor in one block is detachably screwed on a base plate and in principle operates as the above metering elements. However, this block distributor forms a single unit which can only be screwed as a whole onto, or be detached from, the base plate. In the event of one defect, the entire block distributor must be unscrewed from the base plate. If a malfunction occurs that cannot be localized on site, the entire block distributor can be brought into the shop to search for the malfunction and meantime another block distributor may be used on site. In those cases however in which it might be otherwise desired to exchange only part of the block distributor, for instance on account of the above mentioned change in lubricant supply, a new block distributor must nevertheless be installed which provides the desired change at the particular location. Because of the use of another block distributor, substantial equipment costs are incurred.

SUMMARY OF THE INVENTION

Accordingly, it is an object of the invention to improve conventional progressive distributors to meet, in practice, requirements for exchanging the metering elements at minimal equipment and assembly costs.

This objective is achieved by providing an intermediate plate between the metering elements and the base plate of the progressive distributor. The metering elements are detachably connected, preferably screwed, each, to the intermediate plate, and the intermediate plate is detachably connected, preferably screwed, to the base plate, thus permitting either selective removal of individual metering elements, or removal of the entire block.

The additional design cost of the intermediate plate is trivial both with respect to assembly and equipment cost. On the other hand, the intermediate plate offers substantial savings in assembly. In the case where all metering elements must be removed in one operation from the base plate, the intermediate plate need merely be removed from the base plate and then can be sent together with the entirety of these metering elements to the shop (if so required). A new intermediate plate with metering elements affixed to it may then be screwed onto the present base plate. On the other hand, in the case where only a single metering element needs to be removed and replaced by a new one, the operator is required merely to unscrew this single metering element from the intermediate plate and screw the new one onto the intermediate plate.

As a result of the invention, therefore, a defective block of individual metering elements can be replaced by a new shop-tested block of individual metering elements, or a single metering element can be replaced by another single metering element, on site and with trivial installation labor. The shop on the other hand has the time and especially the means with which to carry out the search for defects and the repairs.

If so desired, and most of all where space is at a premium, lubricant control-and-supply conduits which are connected or can be connected to lubricant feed-and-drain lines of the base plate and to intakes and outlets of the metering elements may be provided.

In addition, test screws to check blocking if a lubricant conduit is closed are preferably also provided.

Further advantages and features of the invention are discussed in the description below and the related drawings of the preferred embodiments of the invention.

DETAILED DESCRIPTION OF THE PREFERRED EMBODIMENTS

Figure 2:
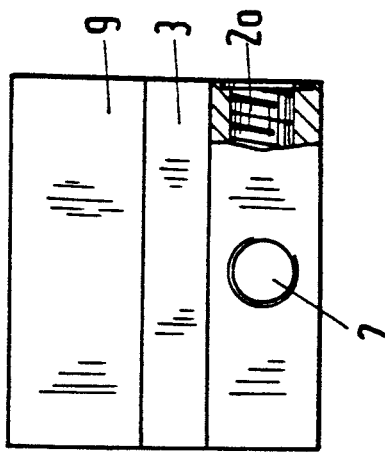
FIG. 2 is a front view of the progressive distributor of FIG. 1.
Figure 1:
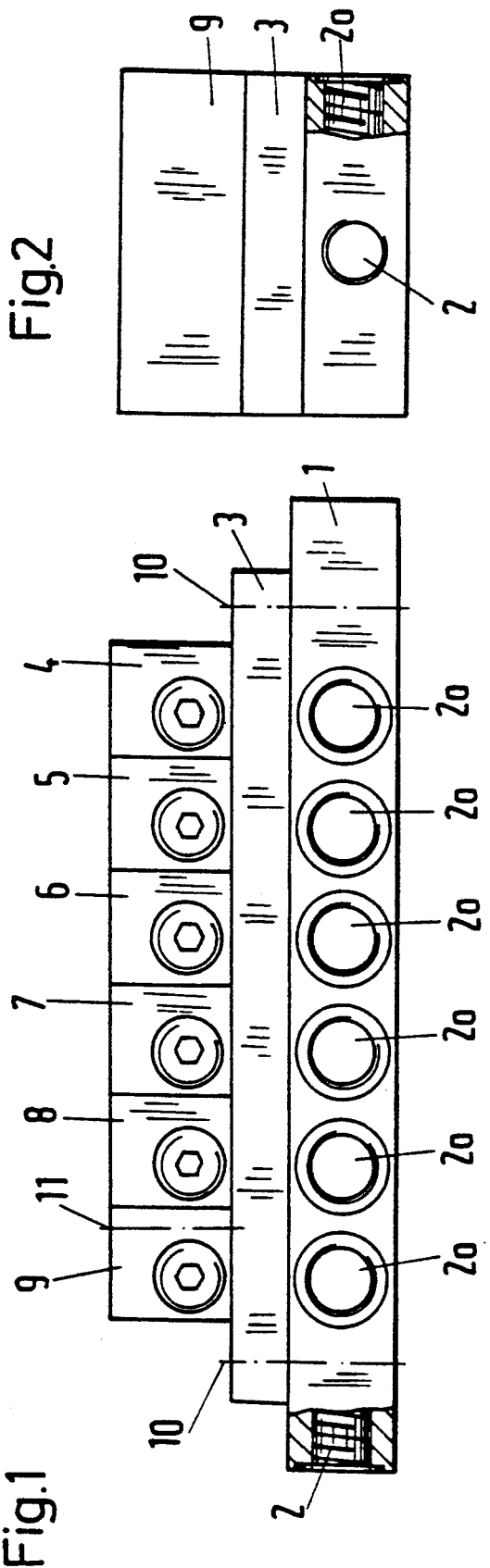
FIG. 1 is a side view of a progressive distributor according to a preferred embodiment of the invention.
Figure 3:
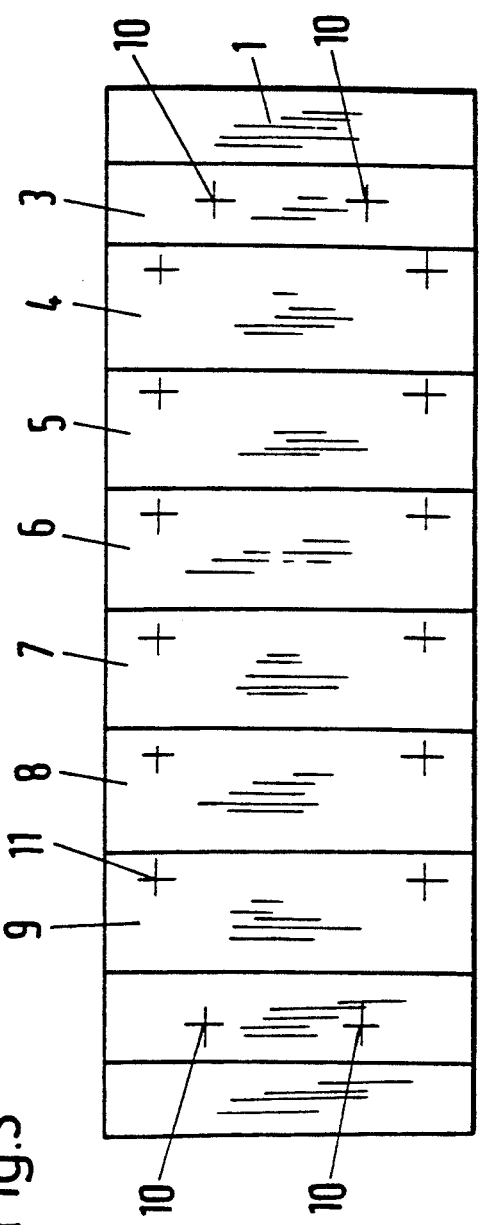
FIG. 3 is the top view of the progressive distributor of FIG. 1.

As shown by FIG. 1, a progressive distributor according to a preferred embodiment of the invention includes a base plate 1 with hookups 2 for the supply conduits and hookups 2a for the drain conduits, and also an intermediate plate 3 screwed on the base plate 1 and a row of metering elements 4-9 with respective screws being connected individually to the intermediate plate 3. Accordingly, the connection between the base plate 1 and the intermediate plate 3 is detachable, and moreover each of the metering elements 4-9 is detachably connected to the intermediate plate 3. The base plate 1 includes individual feed elements or segments with the above hookups 2 and 2a. The lubricant is thereby supplied to the metering elements and return lubricant is drained.

The detachable screw-connection between the intermediate plate 3 and the base plate 1 is shown in dot-dash lines and denoted by the reference 10, whereas the detachable screw-connection of the metering elements 4-9 to the intermediate plate 3, in particular at the metering element 9, is denoted by the reference 11.

Figure 5:
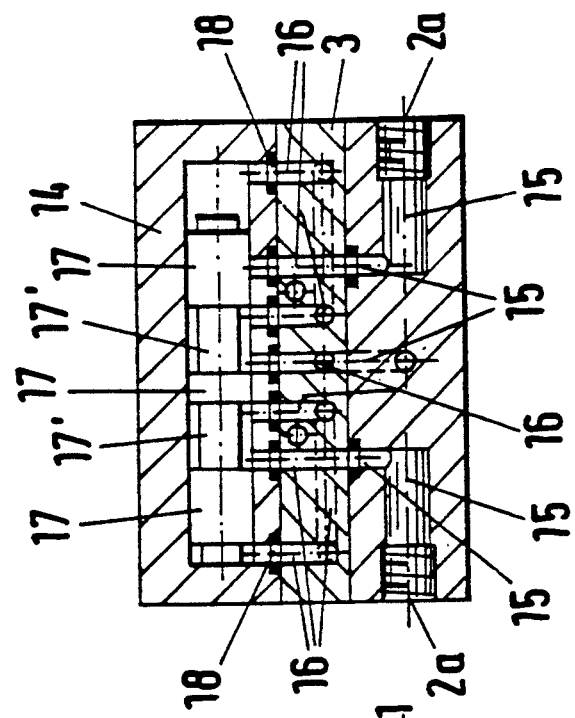
FIG. 5 is a section along line V—V of FIG. 4.
Figure 4:
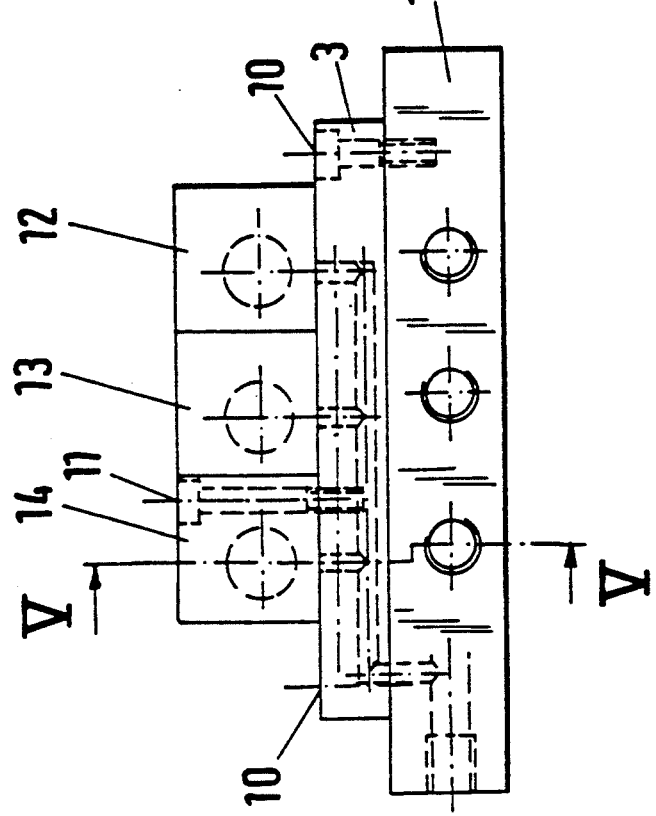
FIG. 4 is a side view of a variation of the preferred embodiment shown in FIGS. 1-3, including an illustration of the conduits and other elements.

FIGS. 4 and 5 show a variation of the preferred embodiment for several metering elements 12, 13, 14 with screw-connection 11 to the intermediate plate 3, and further to the base plate 1. Further shown are the hookups 2 and 2a in the base plate 1, the feed and drain conduits 15 of this base plate 1 to the intermediate plate 3, several conduits 16 inside the intermediate plate 3 going to intakes and outlets 18 of the metering element 14, further piston 17 inside the metering element 14.

The piston control for the progressive distributor is known from the state of the art. Reference is further made to the discussion below of another preferred embodiment of the invention which is shown in FIGS. 6 and 7.

Figure 6:
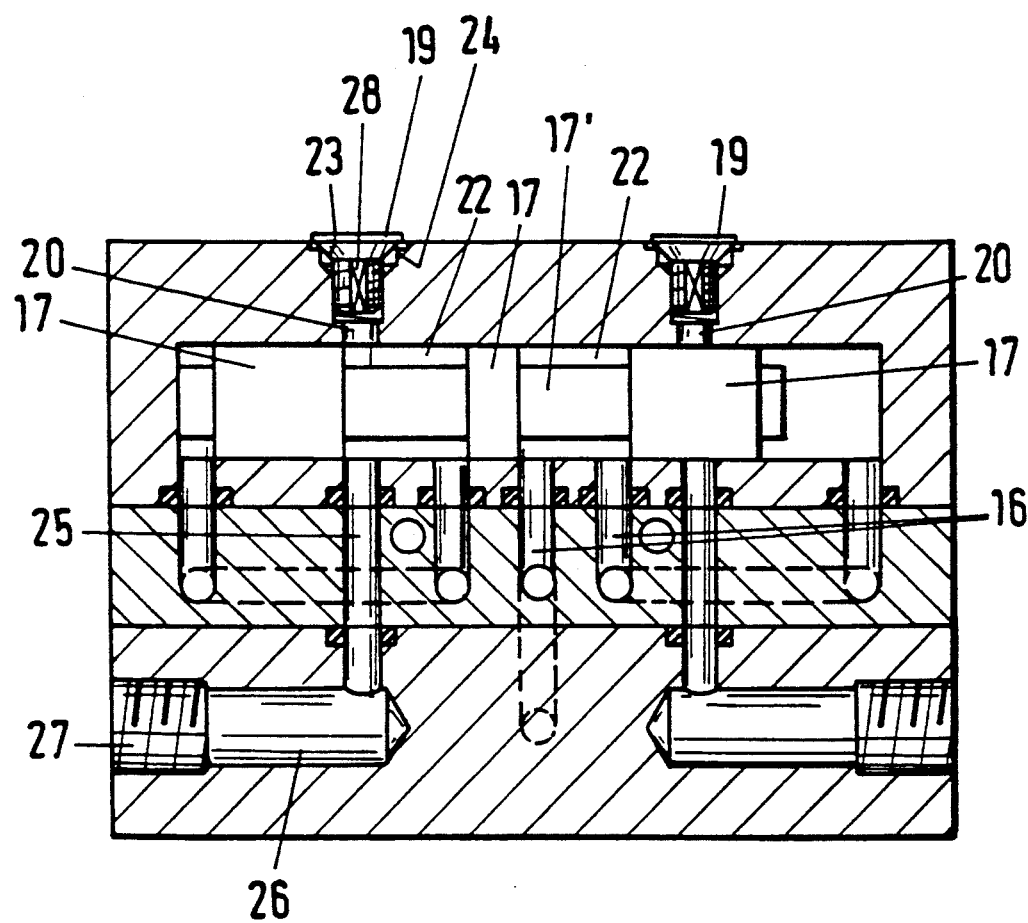
FIG. 6 illustrates another preferred embodiment of the invention, shown in a section corresponding to FIG. 5.
Figure 7:
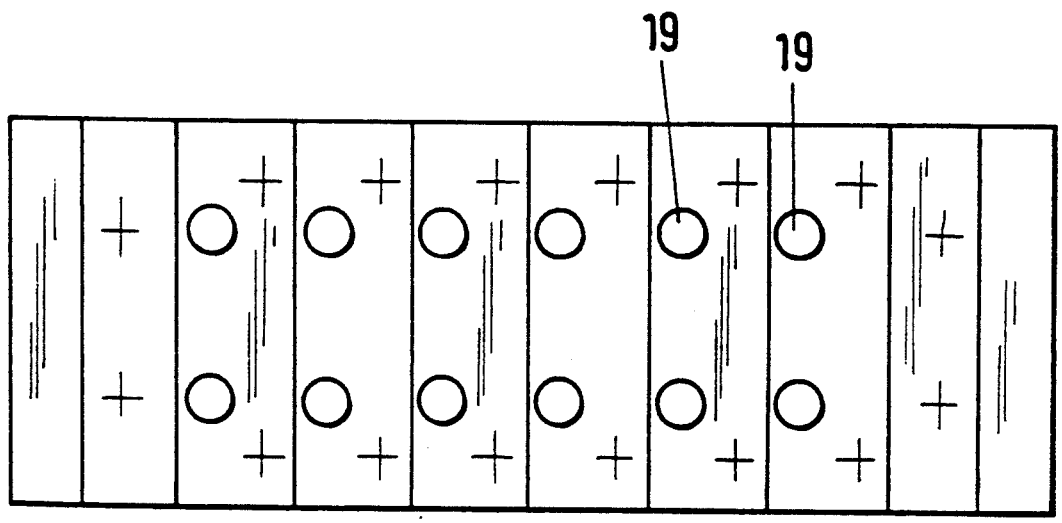
FIG. 7 is a top view of the embodiment of FIG. 6.

FIGS. 6 and 7 show a meter-piston system with several piston zones 17 communicating with one another through segments 17' of lesser diameter. As a result, control ducts 22 are formed, which enclose the segments 17' as annular cylindrical spaces. These cross-sectionally annular-cylindrical control ducts 22 initially may conventionally connect the conduits 16 (FIG. 5).

As a rule, when a lubrication line is closed, for instance due to squeezing a pipe or because of a blind lubrication spot, all lubrication-spot lines from the progressive distributor must be detached until the closed line has been found and the progressive distributor is operative again. As shown by FIGS. 6 and 7, test screws 19 each with an associated outlet 20 are provided at the progressive distributor. They make it possible to eliminate the above discussed, laborious detachment of the lubrication-spot lines. In the event of a blocked lubrication-spot line, pressure builds up, depending on a corresponding piston position, inside the control duct 22 and degrades the sequential control of the progressive distributor or even shuts it down. If now the test screws 19 are sequentially opened, then the raised pressure of the control duct 22 expels to the outside lubricant from the just opened test screw associated with the outlet 20 which communicates with the blocked lubricant line. Each test screw being associated with a corresponding lubrication-spot line, a reliable indicator is thus provided about which lubrication-spot line is blocked, which then can be checked and where called for can be exchanged. Thereupon, normal operation of the progressive distributor resumes. Those skilled in the art will appreciate in this respect that each outlet 20 communicates with a duct 25 identical with the conduit 16 of FIG. 5. This duct 25 continues as the borehole 26 and leads to the hookup 27 of the associated lubricant line.

The test screw 19 may be of different designs. For instance, it may be a hexagonal socket screw, a slotted screw or a knurled screw. In the present case, the test screw includes a conical sealing surface 23 tapering in the screwing direction and resting against a sealing edge 24. As a rule the test screws include a chamfer 28 which allows the lubricant to already drain upon half a revolution of the test screw. While such test screws are known per se, they are not known in relation to the remaining features of the invention.

Having thus described in detail preferred embodiments of the invention, it is nevertheless to be understood that the invention is not to be limited to the embodiments described above and illustrated in the drawings, and that numerous variations of the preferred embodiments may be possible within the scope of the invention. Consequently, it is intended that the invention be limited solely by the appended claims.

What is claimed is:

1. A progressive distributor for lubricants, including a row of metering elements and a base plate made up of individual components which include means defining apertures and conduits for feeding the lubricant to the metering elements, comprising:
    an intermediate plate between the base plate the metering elements; and
    means for permitting either separate removal of the individual metering elements from the intermediate plate, or removal of the intermediate plate together with the individual metering elements from the base plate.
    said separate removal means including means for individually detachably connecting each of the metering elements to the intermediate plate and means for detachably connecting the intermediate plate to the base plate.

2. A progressive distributor as claimed in claim 1, wherein the intermediate plate comprises lubricant control-and-feed conduits and means for connecting the control-and-feed conduits with lubricant supply-and-drain conduits of the base plate and with intakes and outlets of the metering elements.

3. A progressive distributor as claimed in claim 2, wherein the metering elements include test screws arranged to be removed therefrom and which lead through an outlet to a duct at a discharge end of which is located a hookup for a respective lubrication-spot line.

4. A progressive distributor as claimed in claim 1, wherein the metering elements include test screws arranged to be removed therefrom and lead through an outlet to a duct at a discharge end of which is located a hookup for a respective lubrication-spot line.

5. A progressive distributor as claimed in claim 1, wherein said means for detachably connecting the metering elements to the intermediate plate comprise screws.

6. A progressive distributor as claimed in claim 1, wherein said means for detachably connecting the intermediate plate to the base plate comprise screws.

* * * * *